US012739082B2

(12) United States Patent
Xu et al.

(10) Patent No.: US 12,739,082 B2
(45) Date of Patent: Sep. 15, 2026

(54) PERFORMING MEASUREMENTS OF ORTHOGONAL TIME FREQUENCY SPACE MODULATED SOUNDING REFERENCE SIGNALS

(71) Applicant: QUALCOMM Incorporated, San Diego, CA (US)

(72) Inventors: Huilin Xu, Temecula, CA (US); Jun Ma, San Diego, CA (US); Qiang Wu, San Diego, CA (US); Mehmet Izzet Gurelli, San Diego, CA (US); Weimin Duan, San Diego, CA (US); Yuwei Ren, Beijing (CN); Mohamad Sayed Hassan, Paris (FR); Lianghai Ji, San Diego, CA (US); Karthik Anantha Swamy, La Jolla, CA (US)

(73) Assignee: Qualcomm Incorporated, San Diego, CA (US)

(*) Notice: Subject to any disclaimer, the term of this patent is extended or adjusted under 35 U.S.C. 154(b) by 282 days.

(21) Appl. No.: 18/716,286

(22) PCT Filed: Feb. 15, 2022

(86) PCT No.: PCT/CN2022/076310
§ 371 (c)(1),
(2) Date: Jun. 4, 2024

(87) PCT Pub. No.: WO2023/155037
PCT Pub. Date: Aug. 24, 2023

(65) Prior Publication Data

US 2025/0015953 A1 Jan. 9, 2025

(51) Int. Cl.
*H04L 5/00* (2006.01)
*H04W 24/10* (2009.01)
(Continued)

(52) U.S. Cl.
CPC ........... *H04L 5/0051* (2013.01); *H04W 24/10* (2013.01); *H04W 72/40* (2023.01); *H04W 72/541* (2023.01)

(58) Field of Classification Search
CPC ..... H04L 5/0051; H04L 5/006; H04L 5/0073; H04L 5/0094; H04W 24/10; H04W 72/40;
(Continued)

(56) References Cited

U.S. PATENT DOCUMENTS 10,999,026 B2 5/2021 Lee et al.
2021/0328692 A1* 10/2021 Zhang ................. H04B 17/345
(Continued)

FOREIGN PATENT DOCUMENTS

CN 112188542 A 1/2021
WO 2020204405 A1 10/2020
WO WO-2020237561 A1 * 12/2020 ........... H04W 72/23

OTHER PUBLICATIONS

Cohere Technologies: "OTFS Performance in High Doppler with Varying Subcarrier Spacing", 3GPP TSG RA WG1 Meeting #86bis, R1-1609825, Oct. 1, 2016, Lisbon, Portugal, Oct. 10-14, 2016, the whole document, pp. 1-8.
(Continued)

*Primary Examiner* — Vinncelas Louis
(74) *Attorney, Agent, or Firm* — Harrity & Harrity LLP

(57) ABSTRACT

Various aspects of the present disclosure generally relate to wireless communication. In some aspects, a first user equipment (UE) may receive, from a network entity, a cross-link interference (CLI) sounding reference signal (SRS) measurement resource configuration that indicates an orthogonal time frequency space (OTFS) modulated SRS associated with a second UE. The first UE may receive, from the second UE, the OTFS modulated SRS based at least in part on the
(Continued)

700

CLI SRS measurement resource configuration. The first UE may perform a CLI measurement over one or more symbols in which the OTFS modulated SRS is transmitted. The first CE may transmit, to the network entity, a measurement report that indicates the CLI measurement. Numerous other aspects are described.

30 Claims, 13 Drawing Sheets

(51) Int. Cl.
*H04W 72/40* (2023.01)
*H04W 72/541* (2023.01)

(58) Field of Classification Search
CPC .. H04W 72/541; H04W 72/23; H04B 17/328; H04B 17/345
See application file for complete search history.

(56) References Cited

U.S. PATENT DOCUMENTS

2021/0337411 A1* 10/2021 Xu .................... H04B 17/345
2022/0124531 A1* 4/2022 Miao .................... H04L 5/0051
2022/0191724 A1 6/2022 Hwang et al.
2022/0247467 A1* 8/2022 Huang .................. H04W 72/23

OTHER PUBLICATIONS

International Search Report and Written Opinion—PCT/CN2022/076310—ISA/EPO—Sep. 29, 2022.
Supplementary European Search Report EP22926375 Search Authority the Hague Nov. 11, 2025.

* cited by examiner

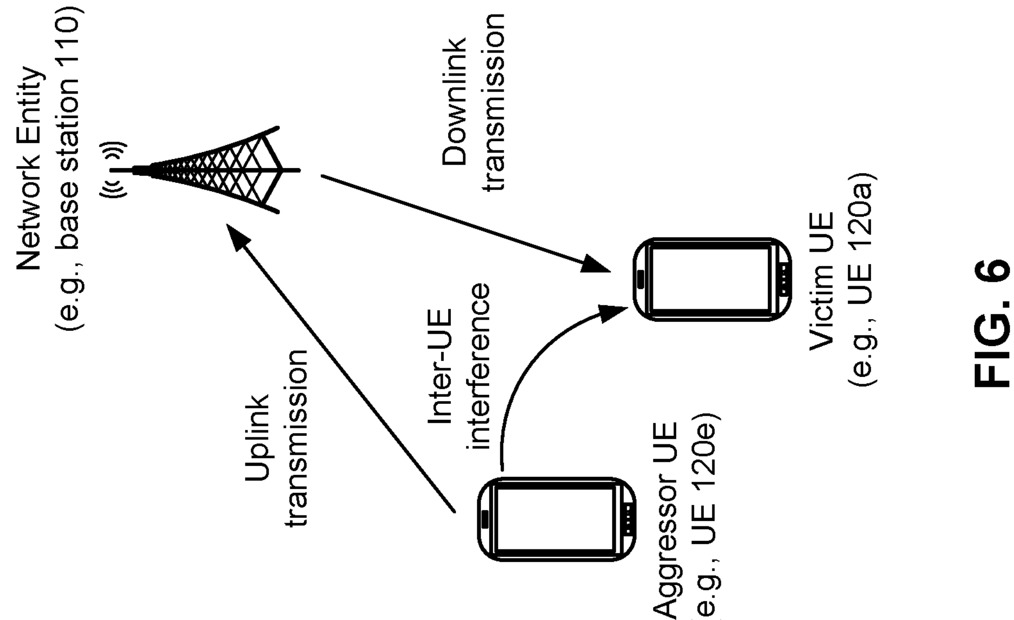
FIG. 6

700

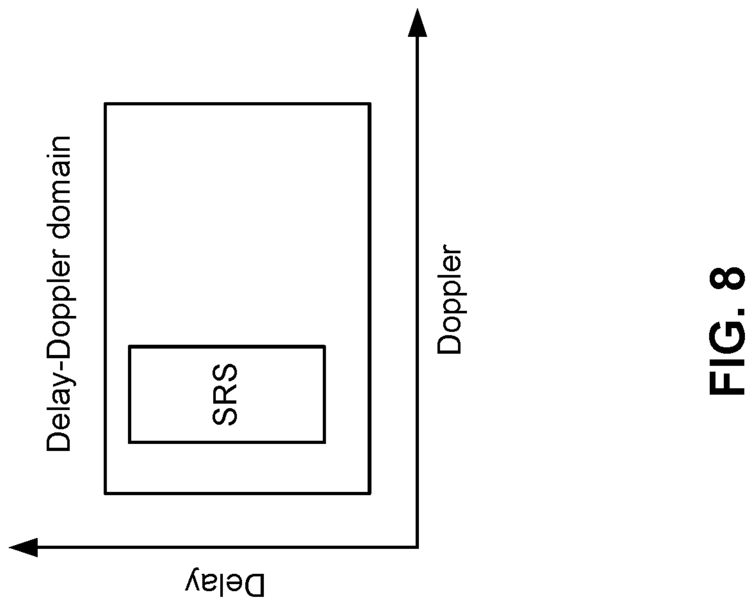
FIG. 8

1000

PERFORMING MEASUREMENTS OF ORTHOGONAL TIME FREQUENCY SPACE MODULATED SOUNDING REFERENCE SIGNALS

CROSS-REFERENCE TO RELATED APPLICATION

This Patent Application is a 371 national stage of PCT Application No. PCT/CN2022/076310 filed on Feb. 15, 2022, entitled "PERFORMING MEASUREMENTS OF ORTHOGONAL TIME FREQUENCY SPACE MODULATED SOUNDING REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for performing measurements of orthogonal time frequency space (OTFS) modulated sounding reference signals (SRSs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: receive, from a network entity, a cross-link interference (CLI) sounding reference signal (SRS) measurement resource configuration that indicates an orthogonal time frequency space (OTFS) modulated SRS associated with a second UE; receive, from the second UE, the OTFS modulated SRS based at least in part on the CLI SRS measurement resource configuration; perform a CLI measurement over one or more symbols in which the OTFS modulated SRS is transmitted; and transmit, to the network entity, a measurement report that indicates the CLI measurement.

In some implementations, an apparatus for wireless communication at a network entity includes a memory and one or more processors, coupled to the memory, configured to: transmit, to a first UE, a CLI SRS measurement resource configuration that indicates an OTFS modulated SRS associated with a second UE; and receive, from the first UE, a measurement report that indicates a CLI measurement of the OTFS modulated SRS, wherein the CLI measurement is associated with one or more symbols in which the OTFS modulated SRS is transmitted.

In some implementations, a method of wireless communication performed by a first UE includes receiving, from a network entity, a CLI SRS measurement resource configuration that indicates an OTFS modulated SRS associated with a second UE; receiving, from the second UE, the OTFS modulated SRS based at least in part on the CLI SRS measurement resource configuration; performing a CLI measurement over one or more symbols in which the OTFS modulated SRS is transmitted; and transmitting, to the network entity, a measurement report that indicates the CLI measurement.

In some implementations, a method of wireless communication performed by a network entity includes transmitting, to a first UE, a CLI SRS measurement resource configuration that indicates an OTFS modulated SRS associated with a second UE; and receiving, from the first UE, a measurement report that indicates a CLI measurement of the OTFS modulated SRS, wherein the CLI measurement is associated with one or more symbols in which the OTFS modulated SRS is transmitted.

In some implementations, a non-transitory computer-readable medium storing a set of instructions for wireless communication includes one or more instructions that, when executed by one or more processors of a first UE, cause the first UE to: receive, from a network entity, a CLI SRS measurement resource configuration that indicates an OTFS modulated SRS associated with a second UE; receive, from the second UE, the OTFS modulated SRS based at least in part on the CLI SRS measurement resource configuration; perform a CLI measurement over one or more symbols in which the OTFS modulated SRS is transmitted; and transmit, to the network entity, a measurement report that indicates the CLI measurement.

In some implementations, a non-transitory computer-readable medium storing a set of instructions for wireless communication includes one or more instructions that, when executed by one or more processors of a network entity, cause the network entity to: transmit, to a first UE, a CLI SRS measurement resource configuration that indicates an OTFS modulated SRS associated with a second UE; and receive, from the first UE, a measurement report that indicates a CLI measurement of the OTFS modulated SRS, wherein the CLI measurement is associated with one or more symbols in which the OTFS modulated SRS is transmitted.

In some implementations, a first apparatus for wireless communication includes means for receiving, from a network entity, a CLI SRS measurement resource configuration that indicates an OTFS modulated SRS associated with a second apparatus; means for receiving, from the second apparatus, the OTFS modulated SRS based at least in part on the CLI SRS measurement resource configuration; means for performing a CLI measurement over one or more symbols in which the OTFS modulated SRS is transmitted; and means for transmitting, to the network entity, a measurement report that indicates the CLI measurement.

In some implementations, an apparatus for wireless communication includes means for transmitting, to a first UE, a CLI SRS measurement resource configuration that indicates an OTFS modulated SRS associated with a second UE; and means for receiving, from the first UE, a measurement report that indicates a CLI measurement of the OTFS modulated SRS, wherein the CLI measurement is associated with one or more symbols in which the OTFS modulated SRS is transmitted.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of inter-UE interference, in accordance with the present disclosure.

FIG. 8 is a diagram illustrating an example associated with an SRS transmission in a delay-Doppler domain, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
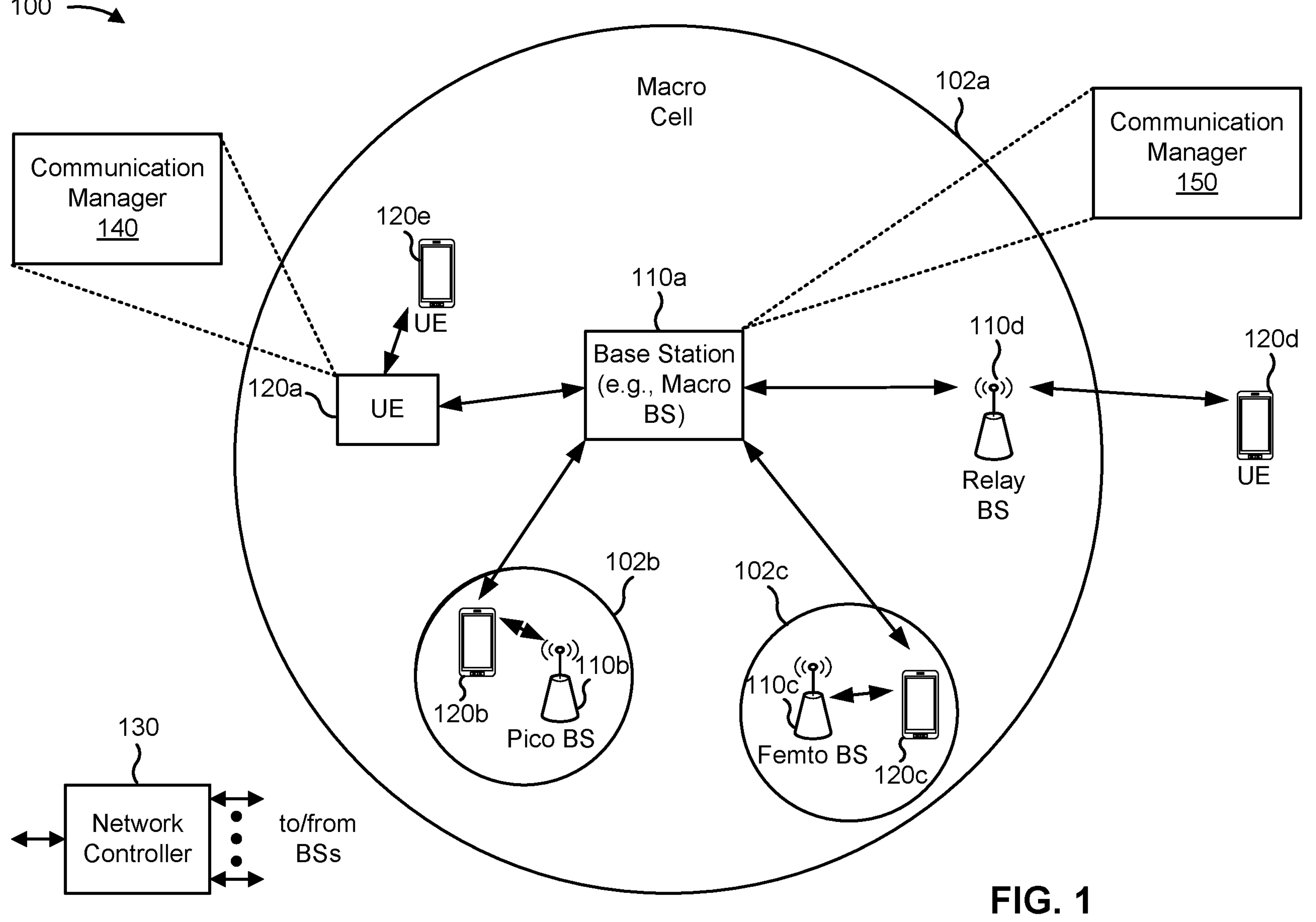
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., 120*a*) may include a communication manager 140. As described in more detail elsewhere herein, the communication manager 140 may receive, from a network entity, a cross-link interference (CLI) sounding reference signal (SRS) measurement resource configuration that indicates an orthogonal time frequency space (OTFS) modulated SRS associated with a second UE; receive, from the second UE, the OTFS modulated SRS based at least in part on the CLI SRS measurement resource configuration; perform a CLI measurement over one or more symbols in which the OTFS modulated SRS is transmitted; and transmit, to the network entity, a measurement report that indicates the CLI measurement. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit, to a first UE, a CLI SRS measurement resource configuration that indicates an OTFS modulated SRS associated with a second UE; and receive, from the first UE, a measurement report that indicates a CLI measurement of the OTFS modulated SRS, wherein the CLI measurement is associated with one or more symbols in which the OTFS modulated SRS is transmitted. Additionally, or alternatively, the communication manager 150 may perform one or more other operations described herein.

As indicated above, FIG. 1 is provided as an example. Other examples may differ from what is described with regard to FIG. 1.

Figure 2:
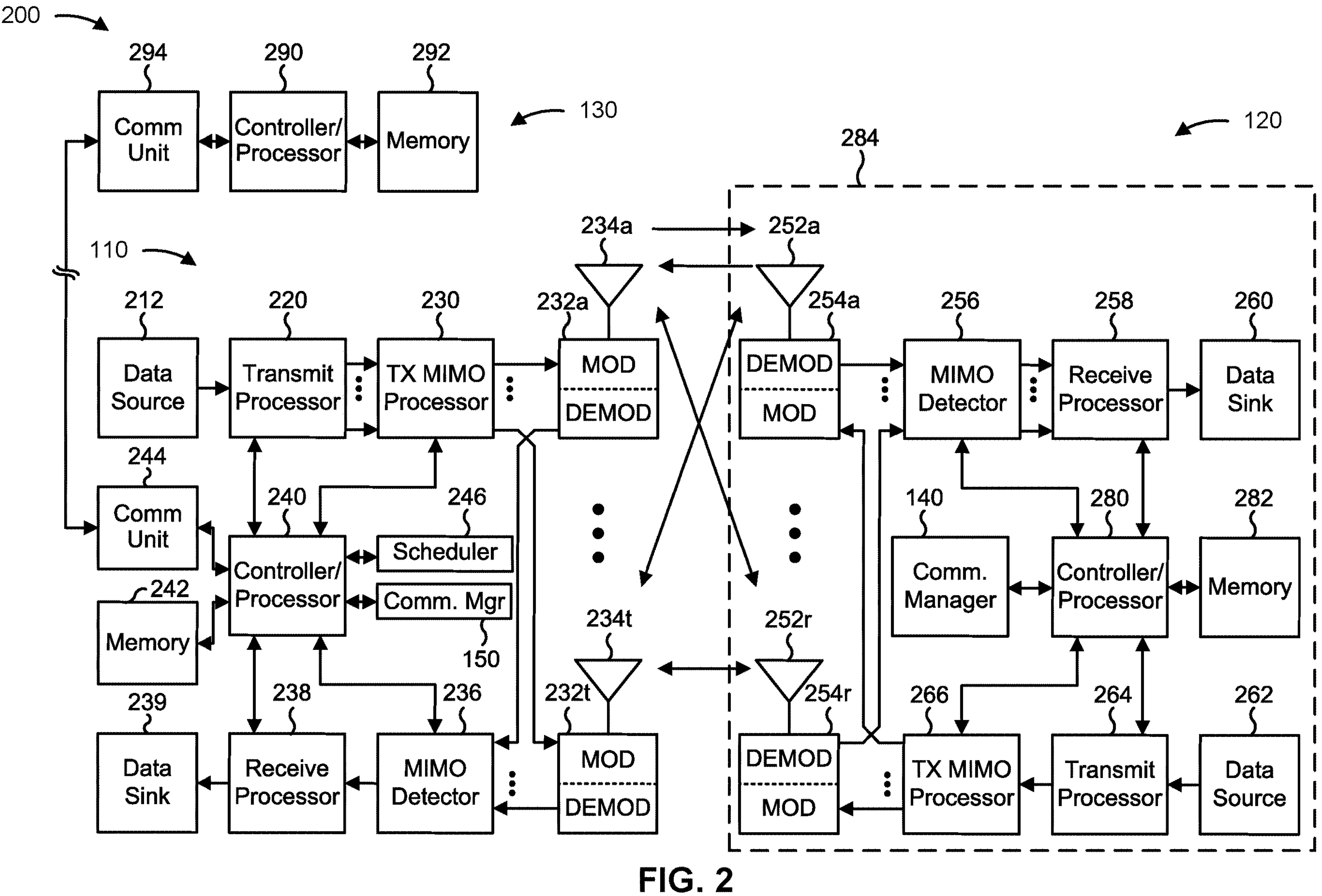
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with performing measurements of OTFS modulated SRSs, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for receiving, from a network entity, a CLI SRS measurement resource configuration that indicates an OTFS modulated SRS associated with a second UE; means for receiving, from the second UE, the OTFS modulated SRS based at least in part on the CLI SRS measurement resource configuration; means for performing a CLI measurement over one or more symbols in which the OTFS modulated SRS is transmitted; and/or means for transmitting, to the network entity, a measurement report that indicates the CLI measurement. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting, to a first UE, a CLI SRS measurement resource configuration that indicates an OTFS modulated SRS associated with a second UE; and/or means for receiving, from the first UE, a measurement report that indicates a CLI measurement of the OTFS modulated SRS, wherein the CLI measurement is associated with one or more symbols in which the OTFS modulated SRS is transmitted. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
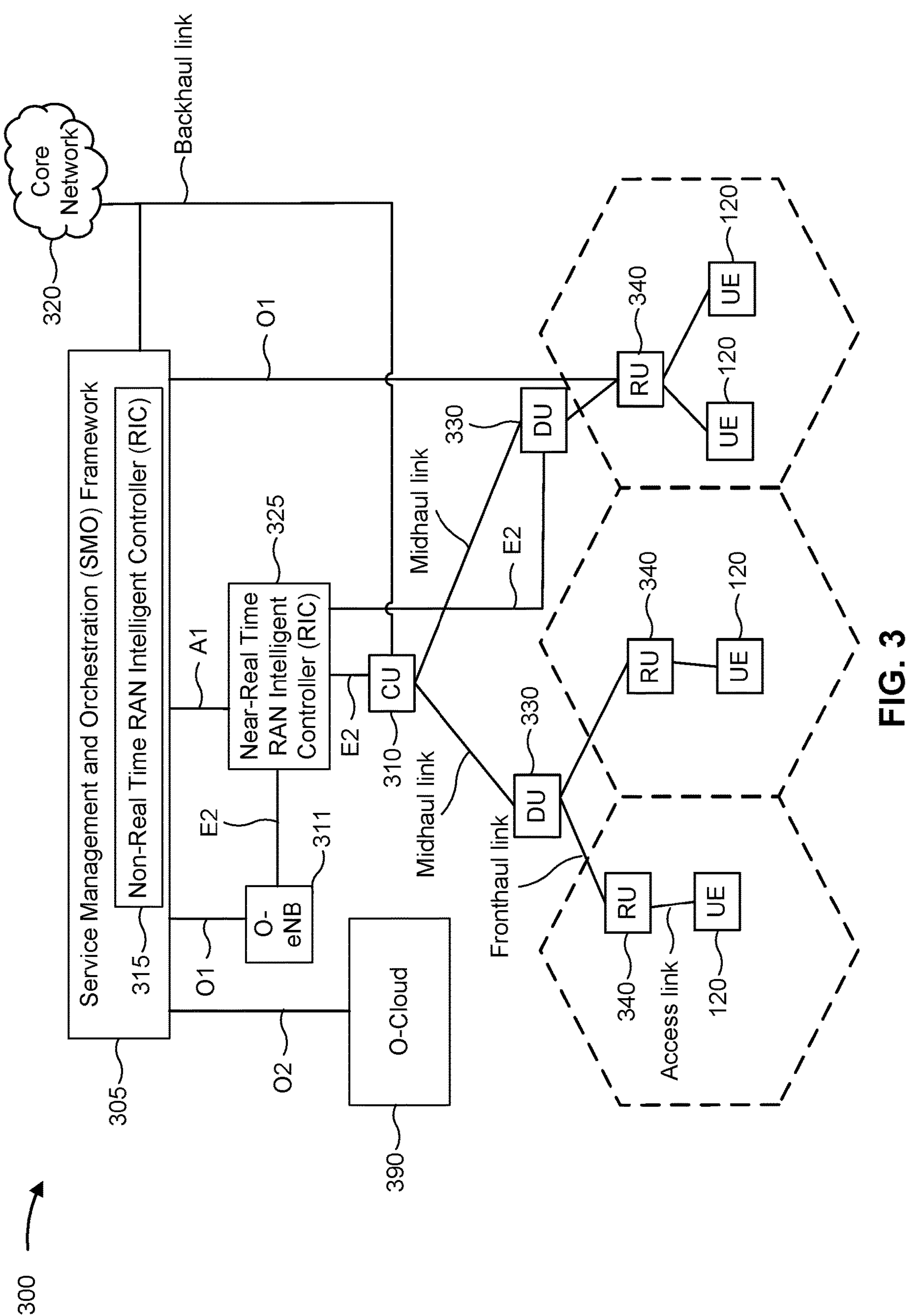
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs. In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

To generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

OTFS modulation is a two-dimensional modulation used to transmit information in a delay-Doppler domain. OTFS modulation may be based at least in part on an inverse symplectic finite Fourier transform (ISFFT) precoder, which may be followed by an N OFDM symbol modulation. An ISFFT may be a two-dimensional Fourier transform. When OTFS modulation is reduced to within a one OFDM symbol duration, the OTFS modulation becomes a DFT-s-OFDM waveform (or single carrier waveform). OTFS modulation/demodulation may benefit from Doppler diversity in a channel with multiple Doppler components, as well as from a multipath diversity gain similar to DFT-s-OFDM. OTFS modulation/demodulation may be suitable for high frequency bands with high UE mobility, and when multiple delay and Doppler components are present in the channel.

Figure 4:
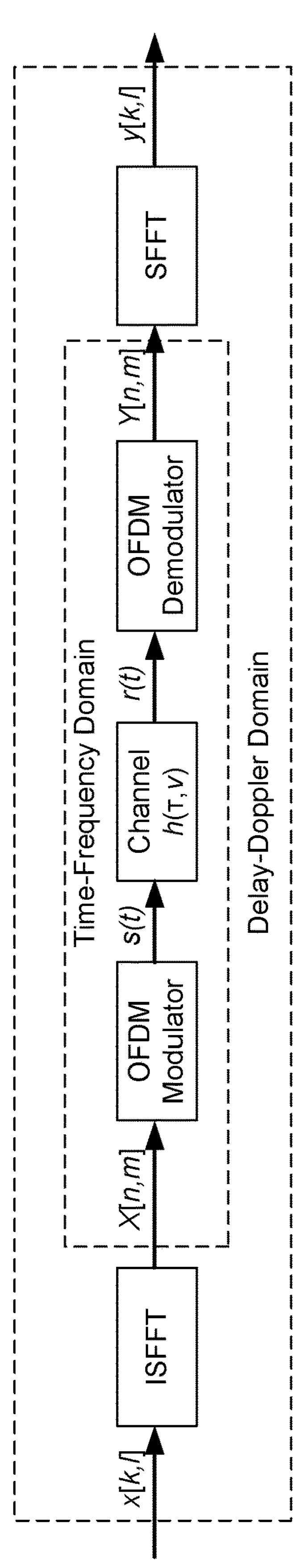
FIG. 4 is a diagram illustrating an example of an orthogonal time frequency space (OTFS) based communication system, in accordance with the present disclosure.
Figure 4:

FIG. 4 is a diagram illustrating an example 400 of an OTFS based communication system, in accordance with the present disclosure.

As shown in FIG. 4, an OFDM transmitter may apply an ISFFT precoder to x[k, l] information samples, which may result in an output of X[n, m]. Information bits of different channels and/or signals may be multiplexed to generate the x[k, l] information samples. The OFDM transmitter may transmit the x[k, l] information samples on a (k, l)th location/sample of an information block in a delay-Doppler domain. The OFDM transmitter may apply an OFDM modulation to X[n, m] to produce a signal s(t). The OFDM transmitter may perform a channel transmission by transmitting the signal s(t) over a channel h(τ, ν). An OFDM receiver may receive signal r(t) over the channel h(τ, ν). The OFDM receiver may apply an OFDM demodulation to produce Y[n, m]. The OFDM receiver may apply a symplectic finite Fourier transform (SFFT) decoder to Y[n, m] to generate y[k, l] information samples. The OFDM modulation, the channel transmission, and the OFDM demodulation may be associated with a time-frequency domain. In the time-frequency domain, OTFS may be realized by the OFDM transmitter and the OFDM receiver by applying the ISFFT precoder and the SFFT decoder, respectively, on top of OFDM. The ISFFT precoding, the OFDM modulation, the channel transmission, the OFDM demodulation, and the SFFT decoding may be associated with the delay-Doppler domain.

As indicated above, FIG. 4 is provided as an example. Other examples may differ from what is described with regard to FIG. 4.

Figure 5:
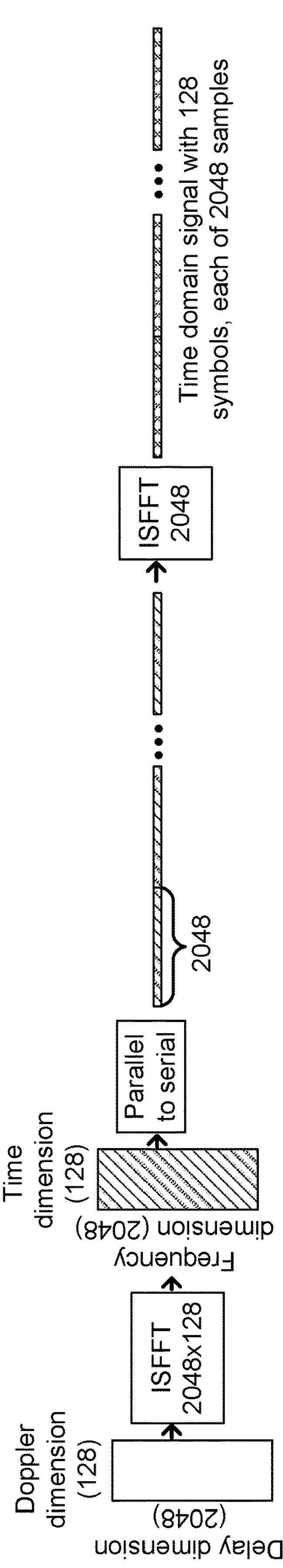
FIG. 5 is a diagram illustrating an example of an OTFS modulation, in accordance with the present disclosure.

FIG. 5 is a diagram illustrating an example 500 of an OTFS modulation, in accordance with the present disclosure.

An OFDM transmitter capable of performing OTFS modulation may perform a conversion of dimension of signals for a data stream. The OFDM transmitter may apply an ISFFT to a signal in a delay-Doppler domain, which may produce a signal in a time-frequency domain. The OFDM transmitter may perform a parallel-to-serial operation to the signal in the time-frequency domain and then an inverse FFT, which may result in a time domain signal with X symbols and each symbol with Y samples. For example, X may be 128 symbols and Y may be 2048 samples. A generated waveform for one OTFS modulation may span a duration of several slots, even when the waveform is consecutively transmitted. A longer duration (in slots) may result in an improved Doppler resolution granularity. When a Doppler domain resolution is one, the OFDM transmitter may perform single symbol DFT-s-OFDM.

An OFDM receiver may perform receive-side operations corresponding to transmit-side operations of the OFDM transmitter.

As indicated above, FIG. 5 is provided as an example. Other examples may differ from what is described with regard to FIG. 5.

With dynamic time division duplexing (TDD), a network entity (e.g., a base station) may flexibly configure different UEs with different Tx and receive (Rx) directions in overlapping symbols. Dynamic TDD may imply full duplex communications at the network entity. Dynamic TDD may improve a spectral efficiency and throughput at the network entity. Dynamic TDD may be based at least in part on a flexible slot format configuration. When Tx and Rx in a same symbol is enabled for a same UE, dynamic TDD may increase a throughput at the UE.

FIG. 6 is a diagram illustrating an example 600 of inter-UE interference, in accordance with the present disclosure.

As shown in FIG. 6, a first UE (e.g., a victim UE) may receive a downlink transmission from a network entity. A second UE (e.g., an aggressor UE), which may be in proximity to the first UE, may transmit an uplink transmission to the network entity. The uplink transmission may cause an inter-UE interference with the downlink transmission, thereby causing the second UE to be an aggressor toward the first UE (the victim UE).

Dynamic TDD and full duplex communications may cause the inter-UE interference between the first UE and the second UE with conflicting Tx and Rx in a same symbol. The network entity may configure the first UE (the victim UE) to measure and report the inter-UE interference to the network entity. The network entity may manage/mitigate the inter-UE interference by properly scheduling the first UE and the second UE.

As indicated above, FIG. 6 is provided as an example. Other examples may differ from what is described with regard to FIG. 6.

Inter-UE interference may also be referred to as UE-to-UE CLI. A network entity may provide a periodic CLI measurement resource configuration to a victim UE, and the victim UE may perform CLI measurements based at least in part on the periodic CLI measurement resource configuration. A CLI measurement may be based at least in part on a CLI SRS RSRP measurement or a CLI RSSI measurement. The CLI SRS RSRP measurement may be associated with an SRS transmission from an aggressor UE to its serving network entity (e.g., serving base station). The CLI RSSI measurement may be associated with another uplink transmission from the aggressor UE to its serving network entity. The aggressor UE may not be aware of the periodic CLI measurement resource configuration for the victim UE, and the aggressor UE may not transmit a signal or channel dedicated for the victim UE's CLI measurement. The CLI measurement may be a layer 3 periodic measurement. The network entity may configure periodic measurement occasions, and on each occasion, the network entity may configure resource allocation information (e.g., symbol(s), resource blocks (RBs), and/or resource elements (REs)) and a sequence (for SRS only) for a measurement resource.

The aggressor UE may apply OTFS modulation to an SRS in a high mobility channel for accurate uplink channel sounding. However, the victim UE performing a CLI measurement based at least in part on the SRS may not be aware that the OTFS modulation is being applied to the SRS. In other words, the victim UE may not be aware of a waveform generation mechanism associated with the SRS. Depending on the victim UE's scheduling and/or capability, the UE may be unable to perform the CLI measurement associated with the SRS when the victim UE is not aware of the waveform generation mechanism used to generate the SRS.

In various aspects of techniques and apparatuses described herein, a first UE (e.g., a victim UE) may receive, from a network entity, a CLI SRS measurement resource configuration that indicates an OTFS modulated SRS associated with a second UE (e.g., an aggressor UE). The CLI SRS measurement resource configuration may indicate that OTFS modulation is applied to an SRS transmitted by the second UE. In other words, the first UE may become aware of the waveform generation mechanism applied at the second UE (e.g., OTFS modulation applied to the SRS) based at least in part on the CLI SRS measurement resource configuration. The first UE may receive, from the second UE, the OTFS modulated SRS based at least in part on the CLI SRS measurement resource configuration, even though the OTFS modulated SRS may be intended for the network entity and not for the first UE. The first UE may perform a CLI measurement over one or more symbols in which the OTFS modulated SRS is transmitted. The CLI measurement may be a CLI SRS RSRP measurement or a CLI RSSI measurement. The first UE may transmit, to the network entity, a measurement report that indicates the CLI measurement. The network entity may perform a scheduling decision for the first UE based at least in part on the measurement report.

Figure 7:
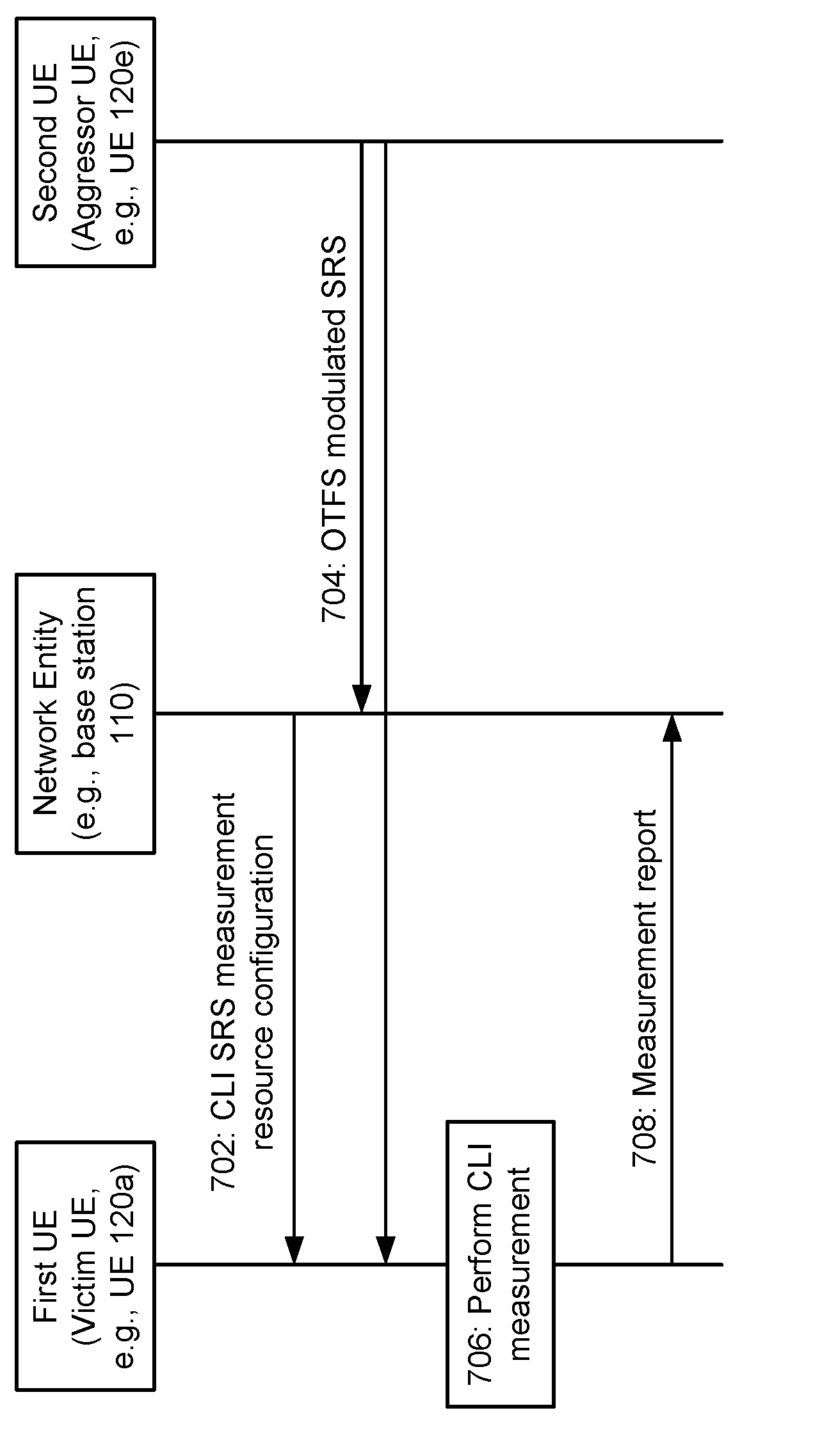
FIG. 7 is a diagram illustrating an example associated with performing measurements of OTFS modulated sounding reference signals (SRSs), in accordance with the present disclosure.

FIG. 7 is a diagram illustrating an example 700 associated with performing measurements of OTFS modulated SRSs, in accordance with the present disclosure. As shown in FIG. 7, example 700 includes communication between a first UE (e.g., UE 120*a*), a second UE (e.g., UE 120*b*), and a network entity (e.g., base station 110). In some aspects, the first UE, the second UE, and the network entity may be included in a wireless network, such as wireless network 100.

In some aspects, the first UE may be a victim UE and the second UE may be an aggressor UE that causes inter-UE interference for the first UE.

As shown by reference number 702, the first UE may receive, from the network entity, a CLI SRS measurement resource configuration. The CLI SRS measurement resource configuration may indicate an OTFS modulated SRS associated with the second UE. The CLI SRS measurement resource configuration may indicate one or more parameters associated with an OTFS modulation applied to the OTFS modulated SRS at the second UE, a delay-Doppler domain dimension associated with the OTFS modulation, and/or a resource allocation pattern associated with the OTFS modulated SRS.

In some aspects, in a high mobility channel environment with multiple Doppler components, applying OTFS modulation to the second UE's uplink transmission includes an SRS to the network entity (e.g., a serving cell base station). With OTFS, the network entity may more accurately estimate an actual uplink channel condition experienced by OTFS modulated uplink data transmissions from the second UE. Otherwise, an uplink sounding may be impacted by inter-carrier interference caused by a Doppler effect.

In some aspects, in NR, a CLI SRS measurement may have each measurement occasion confined within one slot. However, for OTFS, a modulation block may have a relatively large quantity of OFDM symbols (e.g., 128 symbols), which may exceed a quantity of symbols per slot (e.g., 14 symbols per slot). Thus, a limitation of the measurement occasion being within one slot may be removed.

In some aspects, the CLI SRS measurement resource configuration may be upgraded to reflect OTFS modulation applied to the SRS transmitted by the second UE. The CLI SRS measurement resource configuration may include parameters to indicate the OTFS modulation including delay and Doppler domain dimensions associated with the OTFS modulation. The CLI SRS measurement resource configuration may include parameters to indicate a resource allocation pattern associated with the SRS (e.g., a change to a resource allocation in addition to comb-2 or comb-4 within one to four symbols). A quantity of SRS symbols within each measurement occasion may correspond to a quantity of symbols generated by one OTFS modulation operation.

As shown by reference number 704, the first UE may receive, from the second UE, the OTFS modulated SRS based at least in part on the CLI SRS measurement resource configuration. The OTFS modulated SRS may be intended for the network entity. In other words, the second UE may transmit the OTFS modulated SRS to the network entity, but the first UE may also detect the OTFS modulated SRS based at least in part on the CLI SRS measurement resource configuration.

As shown by reference number 706, the first UE may perform a CLI measurement over one or more symbols in which the OTFS modulated SRS is transmitted. In some aspects, when performing the CLI measurement, the first UE may compute a CLI SRS RSRP over a plurality of symbols in which the OTFS modulated SRS is transmitted. The CLI SRS RSRP may be associated with a delay-Doppler domain. In some aspects, the UE may receive the OTFS modulated SRS in a subset of symbols in which the OTFS modulated SRS is transmitted, and when performing the CLI measurement, the first UE may compute a CLI SRS RSRP over the subset of symbols in which the OTFS modulated SRS is transmitted. The CLI SRS RSRP may be associated with a frequency domain and a demodulation of a time domain waveform of the OTFS modulated SRS. In some aspects, the UE may receive the OTFS modulated SRS in the subset of symbols in which the OTFS modulated SRS is transmitted, and when performing the CLI measurement, the first UE may compute a CLI RSSI over the subset of symbols in which the OTFS modulated SRS is transmitted. The CLI RSSI may be associated with the frequency domain and the demodulation of the time domain waveform of the OTFS modulated SRS, or without the demodulation of the time domain waveform of the OTFS modulated SRS.

In some aspects, after the first UE receives the OTFS modulated SRS based at least in part on the CLI SRS measurement resource configuration, the first UE may compute the CLI SRS RSRP. The first UE may perform a full measurement of the OTFS modulated SRS. Based at least in part on the CLI SRS measurement resource configuration for the OTFS modulated SRS, the first UE may compute the CLI SRS RSRP over a plurality of OFDM symbols (e.g., all OFDM symbols) where the OTFS modulated SRS is transmitted. The first UE may perform a full CLI SRS RSRP measurement based at least in part on the plurality of OFDM symbols in which the OTFS modulated SRS is transmitted. The first UE may perform an OFDM demodulation and an OTFS demodulation (e.g., an SFFT decoding) of the time domain waveform. The first UE may compute the CLI SRS RSRP in the delay-Doppler domain, which may require the first UE to receive an entire time domain waveform of the OTFS modulated SRS.

In some aspects, the full measurement (e.g., a measurement performed over all OFDM symbols where the OTFS modulated SRS is transmitted) of a CLI SRS measurement resource may most accurately derive the CLI SRS RSRP associated with the OTFS modulated SRS. The full measurement may extract the OTFS modulated SRS in the delay-Doppler domain only over locations at which the OTFS modulated SRS is transmitted. The full measurement may avoid signals from same or different UEs transmitted on other orthogonal locations different than the locations at which the OTFS modulated SRS is transmitted. Further, the full measurement may not include noise from the other orthogonal locations.

In some aspects, OTFS may generate a relatively long duration waveform in a time domain, so some UEs may prefer to not perform the full measurement. The time domain waveform of the OTFS modulated SRS may collide with other higher priority channels or signals of the first UE, which may include a physical downlink shared channel (PDSCH), a physical downlink control channel (PDCCH) in some downlink symbols, or uplink symbols. In some cases, the first UE may not receive the entire time domain waveform of the OTFS modulated SRS for CLI SRS RSRP measurement due to a collision, or to save power consumption and reduce processing complexity at the first UE.

In some aspects, the first UE may perform a partial measurement of the OTFS modulated SRS. The first UE may perform the partial measurement of an entire OTFS modulated SRS waveform transmitted by the second UE. The first UE may receive the OTFS modulated SRS in a subset of OFDM symbols where the OTFS modulated SRS is transmitted, and the first UE may compute the CLI SRS RSRP based at least in part on the OTFS modulated SRS received in the subset of OFDM symbols where the OTFS modulated SRS is transmitted. The first UE may perform a partial CLI SRS RSRP measurement based at least in part on the subset of OFDM symbols in which the OTFS modulated SRS is transmitted. The first UE may only perform OFDM demodulation of a time domain waveform of the OTFS modulated SRS, and then the first UE may compute the CLI SRS RSRP in a frequency domain. In order to extract signal power from the OTFS modulated SRS received from the second UE, the first UE may generate a frequency domain template of the OTFS modulated SRS, where the frequency domain template may correspond to the OTFS modulated SRS transmitted in an OFDM symbol duration from the second UE.

In some aspects, the partial measurement may be associated with lower complexity and power consumption as compared to the full measurement. However, an orthogonality between the OTFS modulated SRS and other signals may not be maintained. Since OTFS modulation may spread transmitted signals even in a localized area in a delay-Doppler domain into an entire time and frequency domain, the first UE may be affected by noise in an entire bandwidth within an OFDM symbol. Some orthogonality may be present between the OTFS modulated SRS and other signals, and noise suppression may be present due to a pseudo randomness property of the OTFS modulated SRS in the subset of OFDM symbols. A measurement accuracy of the partial measurement may be compromised in comparison to the full measurement.

In some aspects, when the OTFS modulated SRS is measured in the subset of OFDM symbols, processing and/or power consumption at the first UE may be further reduced when the first UE computes a CLI RSSI associated with the OTFS modulated SRS received in the subset of OFDM symbols. The CLI RSSI may not differentiate the OTFS modulated SRS from other concurrent signals and noise, so the CLI RSSI may not accurately reflect an interference strength from the second UE that transmits the OTFS modulated SRS, unless no concurrent signal transmissions from other UEs are present and noise is weak relative to the OTFS modulated SRS. However, an indication of the CLI RSSI may still be useful for the network entity to determine a level of impact on the first UE from interference and noise sources, and the network entity may use the CLI RSSI to schedule the first UE's downlink channels accordingly.

In some aspects, the first UE may perform a partial measurement of the OTFS modulated SRS. The first UE may perform the partial measurement of an entire OTFS modulated SRS waveform transmitted by the second UE. The first UE may receive the OTFS modulated SRS in a subset of OFDM symbols where the OTFS modulated SRS is transmitted, and the first UE may compute the CLI RSSI based at least in part on the OTFS modulated SRS received in the subset of OFDM symbols where the OTFS modulated SRS is transmitted. The first UE may perform a partial CLI RSSI measurement based at least in part on the subset of OFDM symbols in which the OTFS modulated SRS is transmitted. The first UE may compute the CLI RSSI without an OFDM demodulation directly with a time domain waveform of the OTFS modulated SRS. Alternatively, when OFDM demodulation (e.g., FFT) is always enabled, the first UE may compute the CLI RSSI in a frequency domain after the OFDM demodulation. A time domain computation of the CLI RSSI and a frequency domain computation of the CLI RSSI may result in a same mathematical result. The first UE may compute the CLI RSSI by adding energy of a waveform in an OFDM symbol duration in a time domain, or the first UE may compute the CLI RSSI by adding energy of the waveform in an occupied bandwidth of the frequency domain.

As shown by reference number 708, the first UE may transmit, to the network entity, a measurement report that indicates the CLI measurement. The CLI measurement may be the CLI SRS RSRP computed over the plurality of symbols in which the OTFS modulated SRS is transmitted. The CLI measurement may be the CLI SRS RSRP computed over the subset of symbols in which the OTFS modulated SRS is transmitted. The CLI measurement may be the CLI RSSI computed over the subset of symbols in which the OTFS modulated SRS is transmitted. The network entity may perform scheduling decisions for the first UE based at least in part on the measurement report. For example, the network entity may perform scheduling decisions that reduce a level of CLI on the first UE from the second UE.

In some aspects, the first UE may transmit, to the network entity, capability signaling or UE assistance information (UAI) indicating that the first UE is capable of performing CLI SRS RSRP measurements over the plurality of symbols in which the OTFS modulated SRS is transmitted, CLI SRS RSRP measurements over the subset of symbols in which the OTFS modulated SRS is transmitted, and/or CLI RSSI measurements over the subset of symbols in which the OTFS modulated SRS is transmitted.

In some aspects, UE capabilities or UAI may be defined for the first UE to report to the network entity supported operations in terms of CLI SRS measurements performed at the first UE. A UE capability signaling or UAI may be defined for the first UE to report to the network entity the supported operations in terms of CLI SRS measurements, where the first UE may be configured to perform the CLI SRS measurements for OTFS modulated SRSs. The UE capability signaling or UAI may indicate that the first UE supports performing full CLI SRS RSRP measurements, partial CLI SRS RSRP measurements, and/or partial CLI RSSI measurements.

In some aspects, the first UE may transmit, to the network entity, capability signaling or UAI indicating that the first UE is capable of performing CLI SRS reference RSRP measurements over the subset of symbols in which the OTFS modulated SRS is transmitted, and/or CLI RSSI measurements over the subset of symbols in which the OTFS modulated SRS is transmitted, where the first UE may be unable to measure the OTFS modulated SRS over a plurality of symbols in which the OTFS modulated SRS is transmitted based at least in part on a collision of the OTFS modulated SRS with another signal or channel.

In some aspects, UE capabilities or UAI may be defined for the first UE to report to the network entity supported operations in terms of CLI SRS measurements performed at the first UE, where the first UE may be configured to perform the CLI SRS measurements for OTFS modulated SRSs but the first UE may be unable to measure an entire OTFS modulated SRS in a plurality of OFDM symbols (e.g., all OFDM symbols) due to a collision between a waveform of the OTFS modulated SRS and another signal or channel. The other signal or channel may be a PDSCH, a PDCCH, a channel state information reference signal (CSI-RS), or an uplink signal. In some cases, the collision may be between the waveform of the OTFS modulated SRS and a low power operation period. The UE capability signaling or UAI may indicate that the first UE supports performing partial CLI SRS RSRP measurements, and/or partial CLI RSSI measurements.

As indicated above, FIG. 7 is provided as an example. Other examples may differ from what is described with regard to FIG. 7.

FIG. 8 is a diagram illustrating an example 800 associated with an SRS transmission in a delay-Doppler domain, in accordance with the present disclosure.

As shown in FIG. 8, an SRS transmission may be associated with a delay-Doppler domain. The delay-Doppler domain may be different than a conventional time-frequency domain. Other signals may be transmitted in remaining locations of the delay-Doppler domain, which are not occupied by the SRS transmission.

As indicated above, FIG. 8 is provided as an example. Other examples may differ from what is described with regard to FIG. 8.

Figure 9:
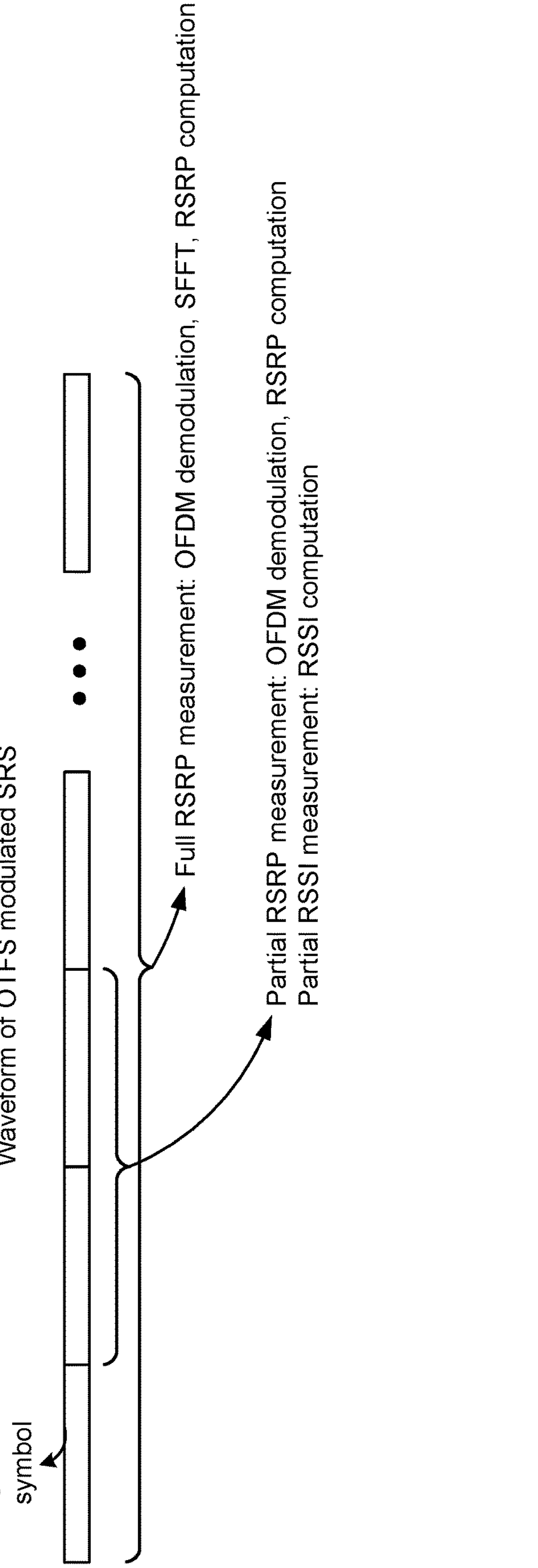
FIG. 9 is a diagram illustrating an example associated with full and partial measurements of an OTFS modulated SRS, in accordance with the present disclosure.

FIG. 9 is a diagram illustrating an example 900 associated with full and partial measurements of an OTFS modulated SRS, in accordance with the present disclosure.

As shown in FIG. 9, a waveform of an OTFS modulated SRS may be transmitted by a second UE (e.g., an aggressor UE) and detected by a first UE (e.g., a victim UE). The first UE may perform a full RSRP measurement with an entire waveform of the OTFS modulated SRS. The full RSRP measurement may involve an OFDM demodulation, an SFFT decoding, and an RSRP computation. The first UE may perform a partial RSRP measurement in two OFDM symbols of the OTFS modulated SRS. The partial RSRP measurement may involve an OFDM demodulation and an RSRP computation. The first UE may perform a partial RSSI measurement in two OFDM symbols of the OTFS modulated SRS. The partial RSSI measurement may involve an RSSI computation.

As indicated above, FIG. 9 is provided as an example. Other examples may differ from what is described with regard to FIG. 9.

Figure 10:
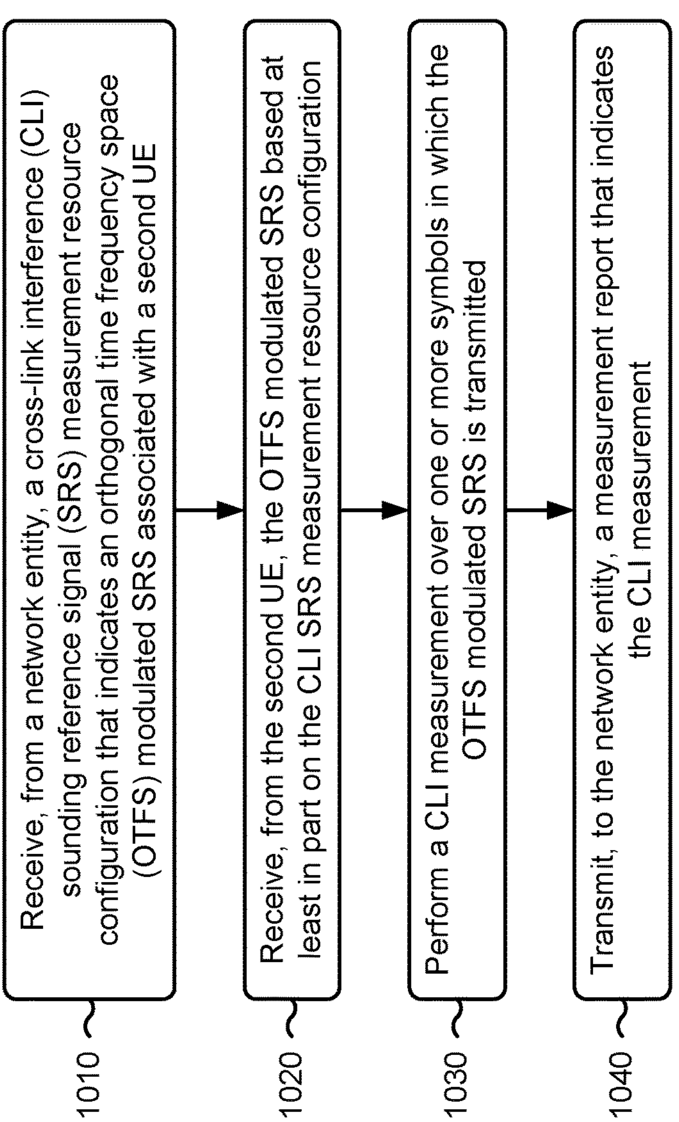
FIGS. 10-11 are diagrams illustrating example processes associated with performing measurements of OTFS modulated SRSs, in accordance with the present disclosure.

FIG. 10 is a diagram illustrating an example process 1000 performed, for example, by a first UE, in accordance with the present disclosure. Example process 1000 is an example where the first UE (e.g., UE 120*a*) performs operations associated with performing measurements of OTFS modulated SRSs.

As shown in FIG. 10, in some aspects, process 1000 may include receiving, from a network entity, a CLI SRS measurement resource configuration that indicates an OTFS modulated SRS associated with a second UE (block 1010). For example, the UE (e.g., using communication manager 140 and/or reception component 1202, depicted in FIG. 12) may receive, from a network entity, a CLI SRS measurement resource configuration that indicates an OTFS modulated SRS associated with a second UE, as described above.

As further shown in FIG. 10, in some aspects, process 1000 may include receiving, from the second UE, the OTFS modulated SRS based at least in part on the CLI SRS measurement resource configuration (block 1020). For example, the UE (e.g., using communication manager 140 and/or reception component 1202, depicted in FIG. 12) may receive, from the second UE, the OTFS modulated SRS based at least in part on the CLI SRS measurement resource configuration, as described above.

As further shown in FIG. 10, in some aspects, process 1000 may include performing a CLI measurement over one or more symbols in which the OTFS modulated SRS is transmitted (block 1030). For example, the UE (e.g., using communication manager 140 and/or measurement component 1208, depicted in FIG. 12) may perform a CLI measurement over one or more symbols in which the OTFS modulated SRS is transmitted, as described above.

As further shown in FIG. 10, in some aspects, process 1000 may include transmitting, to the network entity, a measurement report that indicates the CLI measurement (block 1040). For example, the UE (e.g., using communication manager 140 and/or transmission component 1204, depicted in FIG. 12) may transmit, to the network entity, a measurement report that indicates the CLI measurement, as described above.

Process 1000 may include additional aspects, such as any single aspect or any combination of aspects described below and/or in connection with one or more other processes described elsewhere herein.

In a first aspect, with respect to process 1000, the CLI SRS measurement resource configuration indicates one or more parameters associated with one or more of an OTFS modulation applied to the OTFS modulated SRS at the second UE, a delay-Doppler domain dimension associated with the OTFS modulation, or a resource allocation pattern associated with the OTFS modulated SRS, and a quantity of SRS symbols within each measurement occasion corresponds to a quantity of symbols generated by one OTFS modulation operation.

In a second aspect, alone or in combination with the first aspect, process 1000 includes computing a CLI SRS RSRP over a plurality of symbols in which the OTFS modulated SRS is transmitted, wherein the CLI SRS RSRP is associated with a delay-Doppler domain.

In a third aspect, alone or in combination with one or more of the first and second aspects, process 1000 includes receiving the OTFS modulated SRS in a subset of symbols in which the OTFS modulated SRS is transmitted, and performing the CLI measurement comprises computing a CLI SRS RSRP over the subset of symbols in which the OTFS modulated SRS is transmitted, wherein the CLI SRS RSRP is associated with a frequency domain and a demodulation of a time domain waveform of the OTFS modulated SRS.

In a fourth aspect, alone or in combination with one or more of the first through third aspects, process 1000 includes receiving the OTFS modulated SRS in a subset of symbols in which the OTFS modulated SRS is transmitted, and performing the CLI measurement comprises computing a CLI RSSI over the subset of symbols in which the OTFS modulated SRS is transmitted, wherein the CLI RSSI is associated with a time domain or a frequency domain and a demodulation of a time domain waveform of the OTFS modulated SRS.

In a fifth aspect, alone or in combination with one or more of the first through fourth aspects, process 1000 includes transmitting, to the network entity, capability signaling or UAI that indicates that the first UE is capable of performing one or more of CLI SRS RSRP measurements over a plurality of symbols in which the OTFS modulated SRS is transmitted, CLI SRS RSRP measurements over a subset of symbols in which the OTFS modulated SRS is transmitted, or CLI RSSI measurements over the subset of symbols in which the OTFS modulated SRS is transmitted.

In a sixth aspect, alone or in combination with one or more of the first through fifth aspects, process 1000 includes transmitting, to the network entity, capability signaling or UAI that indicates that the first UE is capable of performing one or more of CLI SRS RSRP measurements over a subset of symbols in which the OTFS modulated SRS is transmitted, or CLI RSSI measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

In a seventh aspect, alone or in combination with one or more of the first through sixth aspects, with respect to process 1000, the first UE is a victim UE and the second UE is an aggressor UE that causes inter-UE interference for the first UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
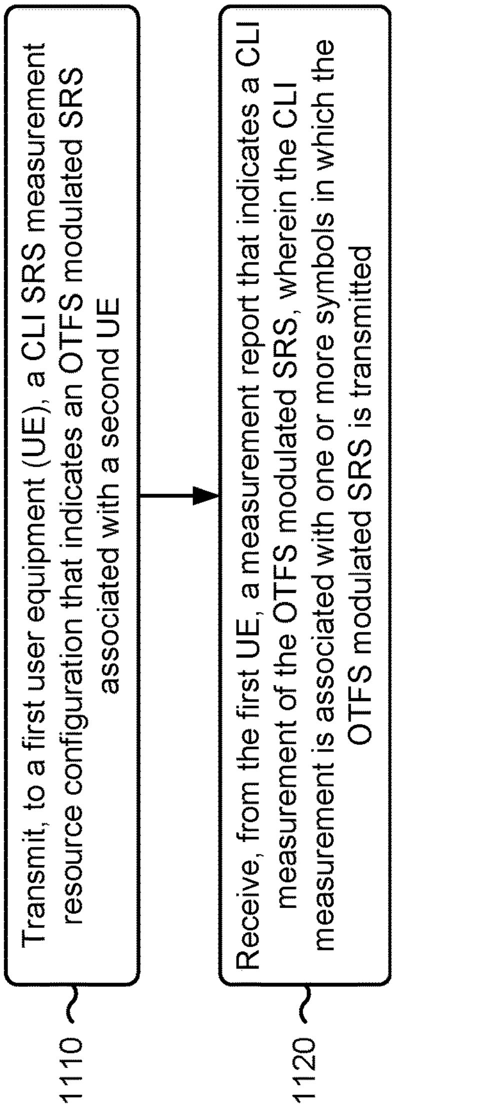

FIG. 11 is a diagram illustrating an example process 1100 performed, for example, by a network entity, in accordance with the present disclosure. Example process 1100 is an example where the network entity (e.g., base station 110) performs operations associated with performing measurements of OTFS modulated SRSs.

As shown in FIG. 11, in some aspects, process 1100 may include transmitting, to a first UE, a CLI SRS measurement resource configuration that indicates an OTFS modulated SRS associated with a second UE (block 1110). For example, the network entity (e.g., using transmission component 1304, depicted in FIG. 13) may transmit, to a first UE, a CLI SRS measurement resource configuration that indicates an OTFS modulated SRS associated with a second UE, as described above.

As further shown in FIG. 11, in some aspects, process 1100 may include receiving, from the first UE, a measurement report that indicates a CLI measurement of the OTFS modulated SRS, wherein the CLI measurement is associated with one or more symbols in which the OTFS modulated SRS is transmitted (block 1120). For example, the network entity (e.g., using reception component 1302, depicted in FIG. 13) may receive, from the first UE, a measurement report that indicates a CLI measurement of the OTFS modulated SRS, wherein the CLI measurement is associated with one or more symbols in which the OTFS modulated SRS is transmitted, as described above.

Process 1100 may include additional aspects, such as any single aspect or any combination of aspects described below and/or in connection with one or more other processes described elsewhere herein.

In a first aspect, with respect to process 1100, the CLI SRS measurement resource configuration indicates one or more parameters associated with one or more of an OTFS modulation applied to the OTFS modulated SRS at the second UE, a delay-Doppler domain dimension associated with the OTFS modulation, or a resource allocation pattern associated with the OTFS modulated SRS, and a quantity of SRS symbols within each measurement occasion corresponds to a quantity of symbols generated by one OTFS modulation operation.

In a second aspect, alone or in combination with the first aspect, with respect to process 1100, the CLI measurement is a CLI SRS RSRP computed over a plurality of symbols in which the OTFS modulated SRS is transmitted, wherein the CLI SRS RSRP is associated with a delay-Doppler domain.

In a third aspect, alone or in combination with one or more of the first and second aspects, with respect to process 1100, the CLI measurement is a CLI SRS RSRP computed over a subset of symbols in which the OTFS modulated SRS is transmitted, wherein the CLI SRS RSRP is associated with a frequency domain and a demodulation of a time domain waveform of the OTFS modulated SRS.

In a fourth aspect, alone or in combination with one or more of the first through third aspects, with respect to process 1100, the CLI measurement is a CLI RSSI computed over a subset of symbols in which the OTFS modulated SRS is transmitted, wherein the CLI RSSI is associated with a time domain or a frequency domain and a demodulation of a time domain waveform of the OTFS modulated SRS.

In a fifth aspect, alone or in combination with one or more of the first through fourth aspects, process 1100 includes receiving, from the first UE, capability signaling or UAI that indicates that the first UE is capable of performing one or more of CLI SRS RSRP measurements over a plurality of symbols in which the OTFS modulated SRS is transmitted, CLI SRS RSRP measurements over a subset of symbols in which the OTFS modulated SRS is transmitted, or CLI RSSI measurements over the subset of symbols in which the OTFS modulated SRS is transmitted.

In a sixth aspect, alone or in combination with one or more of the first through fifth aspects, process 1100 includes receiving, from the first UE, capability signaling or UAI that indicates that the first UE is capable of performing one or more of CLI SRS RSRP measurements over a subset of symbols in which the OTFS modulated SRS is transmitted, or CLI RSSI measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
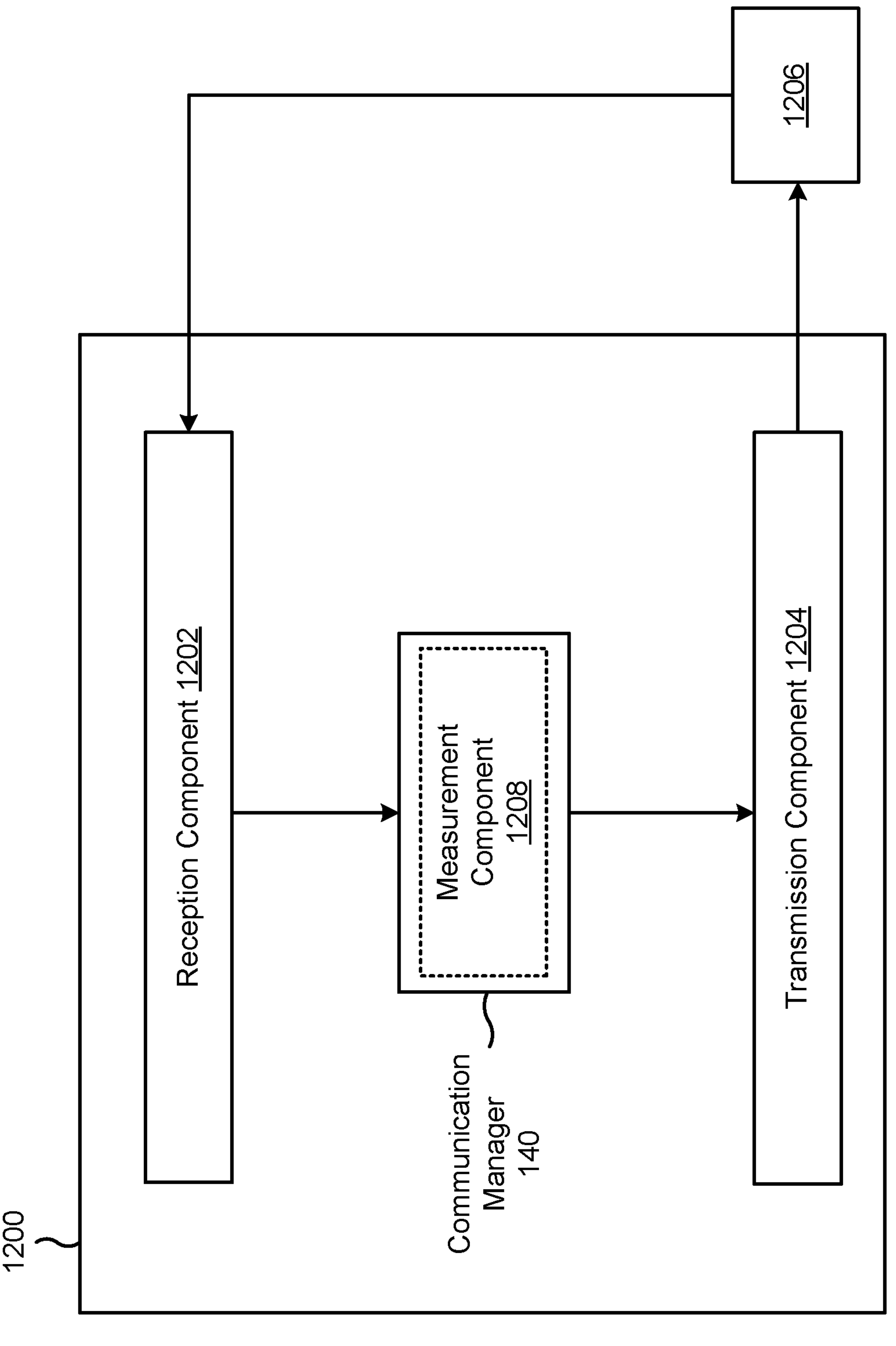
FIGS. 12-13 are diagrams of example apparatuses for wireless communication, in accordance with the present disclosure.

FIG. 12 is a diagram of an example apparatus 1200 for wireless communication. The apparatus 1200 may be a first UE, or a first UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a measurement component 1208, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the first UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the first UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the first UE described in connection with FIG. 2. In some aspects, the transmission component 1204 may be co-located with the reception component 1202 in a transceiver.

The reception component 1202 may receive, from a network entity, a CLI SRS measurement resource configuration that indicates an OTFS modulated SRS associated with a second UE. The reception component 1202 may receive, from the second UE, the OTFS modulated SRS based at least in part on the CLI SRS measurement resource configuration. The measurement component 1208 may perform a CLI measurement over one or more symbols in which the OTFS modulated SRS is transmitted. The transmission component 1204 may transmit, to the network entity, a measurement report that indicates the CLI measurement.

The measurement component 1208 may compute a CLI SRS RSRP over a plurality of symbols in which the OTFS modulated SRS is transmitted, wherein the CLI SRS RSRP is associated with a delay-Doppler domain.

The reception component 1202 may receive the OTFS modulated SRS in a subset of symbols in which the OTFS modulated SRS is transmitted. The measurement component 1208 may compute a CLI SRS RSRP over the subset of symbols in which the OTFS modulated SRS is transmitted, wherein the CLI SRS RSRP is associated with a frequency domain and a demodulation of a time domain waveform of the OTFS modulated SRS.

The reception component 1202 may receive the OTFS modulated SRS in a subset of symbols in which the OTFS modulated SRS is transmitted. The measurement component 1208 may compute a CLI RSSI over the subset of symbols in which the OTFS modulated SRS is transmitted, wherein the CLI RSSI is associated with a time domain or a frequency domain and a demodulation of a time domain waveform of the OTFS modulated SRS.

The transmission component 1204 may transmit, to the network entity, capability signaling or UAI that indicates that the first UE is capable of performing one or more of: CLI SRS RSRP measurements over a plurality of symbols in which the OTFS modulated SRS is transmitted, CLI SRS RSRP measurements over a subset of symbols in which the OTFS modulated SRS is transmitted, or CLI RSSI measurements over the subset of symbols in which the OTFS modulated SRS is transmitted.

The transmission component 1204 may transmit, to the network entity, capability signaling or UAI that indicates that the first UE is capable of performing one or more of: CLI SRS RSRP measurements over a subset of symbols in which the OTFS modulated SRS is transmitted, or CLI RSSI measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
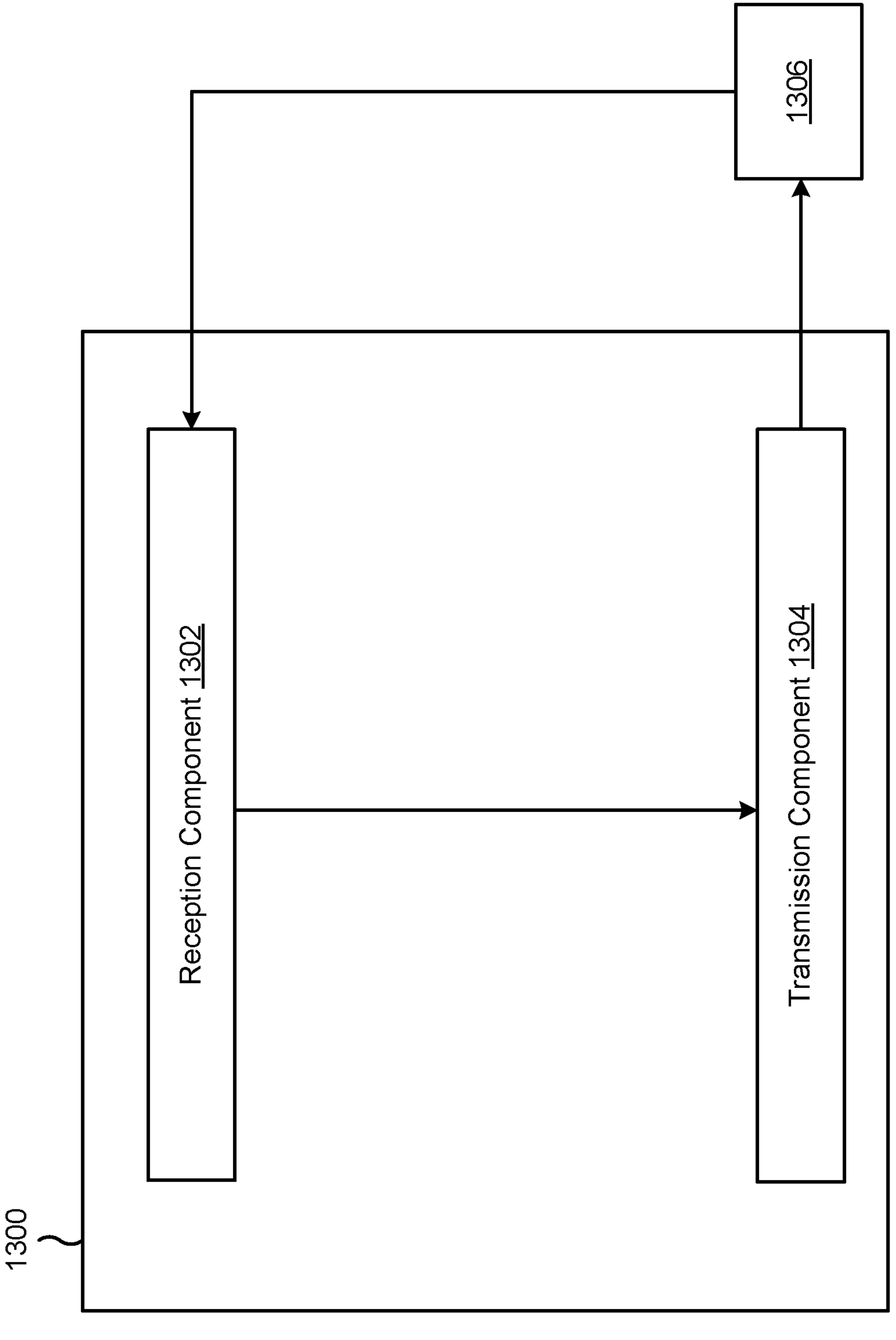

FIG. 13 is a diagram of an example apparatus 1300 for wireless communication. The apparatus 1300 may be a network entity, or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 may transmit, to a first UE, a CLI SRS measurement resource configuration that indicates an OTFS modulated SRS associated with a second UE. The reception component 1302 may receive, from the first UE, a measurement report that indicates a CLI measurement of the OTFS modulated SRS, wherein the CLI measurement is associated with one or more symbols in which the OTFS modulated SRS is transmitted.

The reception component 1302 may receive, from the first UE, capability signaling or UAI that indicates that the first UE is capable of performing one or more of: CLI SRS RSRP measurements over a plurality of symbols in which the OTFS modulated SRS is transmitted, CLI SRS RSRP measurements over a subset of symbols in which the OTFS modulated SRS is transmitted, or CLI RSSI measurements over the subset of symbols in which the OTFS modulated SRS is transmitted.

The reception component 1302 may receive, from the first UE, capability signaling or UAI that indicates that the first UE is capable of performing one or more of: CLI SRS RSRP measurements over a subset of symbols in which the OTFS modulated SRS is transmitted, or CLI RSSI measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving, from a network entity, a cross-link interference (CLI) sounding reference signal (SRS) measurement resource configuration that indicates an orthogonal time frequency space (OTFS) modulated SRS associated with a second UE; receiving, from the second UE, the OTFS modulated SRS based at least in part on the CLI SRS measurement resource configuration; performing a CLI measurement over one or more symbols in which the OTFS modulated SRS is transmitted; and transmitting, to the network entity, a measurement report that indicates the CLI measurement.

Aspect 2: The method of Aspect 1, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

Aspect 3: The method of any of Aspects 1 through 2, wherein performing the CLI measurement comprises computing a CLI SRS reference signal received power (RSRP) over a plurality of symbols in which the OTFS modulated SRS is transmitted, wherein the CLI SRS RSRP is associated with a delay-Doppler domain.

Aspect 4: The method of any of Aspects 1 through 3, wherein: receiving the OTFS modulated SRS comprises receiving the OTFS modulated SRS in a subset of symbols in which the OTFS modulated SRS is transmitted; and performing the CLI measurement comprises computing a CLI SRS reference signal received power (RSRP) over the subset of symbols in which the OTFS modulated SRS is transmitted, wherein the CLI SRS RSRP is associated with a frequency domain and a demodulation of a time domain waveform of the OTFS modulated SRS.

Aspect 5: The method of any of Aspects 1 through 4, wherein: receiving the OTFS modulated SRS comprises receiving the OTFS modulated SRS in a subset of symbols in which the OTFS modulated SRS is transmitted; and performing the CLI measurement comprises computing a CLI received signal strength indicator (RSSI) over the subset of symbols in which the OTFS modulated SRS is transmitted, wherein the CLI RSSI is associated with a time domain or a frequency domain and a demodulation of a time domain waveform of the OTFS modulated SRS.

Aspect 6: The method of any of Aspects 1 through 5, further comprising: transmitting, to the network entity, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

Aspect 7: The method of any of Aspects 1 through 6, further comprising: transmitting, to the network entity, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

Aspect 8: The method of any of Aspects 1 through 7, wherein the first UE is a victim UE and the second UE is an aggressor UE that causes inter-UE interference for the first UE.

Aspect 9: A method of wireless communication performed by a network entity, comprising: transmitting, to a first user equipment (UE), a cross-link interference (CLI) sounding reference signal (SRS) measurement resource configuration that indicates an orthogonal time frequency space (OTFS) modulated SRS associated with a second UE; and receiving, from the first UE, a measurement report that indicates a CLI measurement of the OTFS modulated SRS, wherein the CLI measurement is associated with one or more symbols in which the OTFS modulated SRS is transmitted.

Aspect 10: The method of Aspect 9, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

Aspect 11: The method of any of Aspects 9 through 10, wherein the CLI measurement is a CLI SRS reference signal received power (RSRP) computed over a plurality of symbols in which the OTFS modulated SRS is transmitted, wherein the CLI SRS RSRP is associated with a delay-Doppler domain.

Aspect 12: The method of any of Aspects 9 through 11, wherein the CLI measurement is a CLI SRS reference signal received power (RSRP) computed over a subset of symbols in which the OTFS modulated SRS is transmitted, wherein the CLI SRS RSRP is associated with a frequency domain and a demodulation of a time domain waveform of the OTFS modulated SRS.

Aspect 13: The method of any of Aspects 9 through 12, wherein the CLI measurement is a CLI received signal strength indicator (RSSI) computed over a subset of symbols in which the OTFS modulated SRS is transmitted, wherein the CLI RSSI is associated with a time domain or a frequency domain and a demodulation of a time domain waveform of the OTFS modulated SRS.

Aspect 14: The method of any of Aspects 9 through 13, further comprising: receiving, from the first UE, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

Aspect 15: The method of any of Aspects 9 through 14, further comprising: receiving, from the first UE, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
- a memory; and
- one or more processors, coupled to the memory, configured to:
  - receive, from a network entity, a cross-link interference (CLI) sounding reference signal (SRS) measurement resource configuration that indicates an orthogonal time frequency space (OTFS) modulated SRS associated with a second UE;
  - receive, from the second UE, the OTFS modulated SRS based at least in part on the CLI SRS measurement resource configuration;
  - perform a CLI measurement over one or more symbols in which the OTFS modulated SRS is transmitted; and
  - transmit, to the network entity, a measurement report that indicates the CLI measurement.

2. The apparatus of claim 1, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

3. The apparatus of claim 1, wherein performing the CLI measurement comprises computing a CLI SRS reference signal received power (RSRP) over a plurality of symbols in which the OTFS modulated SRS is transmitted, wherein the CLI SRS RSRP is associated with a delay-Doppler domain.

4. The apparatus of claim 1, wherein:
- receive the OTFS modulated SRS comprises receiving the OTFS modulated SRS in a subset of symbols in which the OTFS modulated SRS is transmitted; and
- perform the CLI measurement comprises computing a CLI SRS reference signal received power (RSRP) over the subset of symbols in which the OTFS modulated SRS is transmitted, wherein the CLI SRS RSRP is associated with a frequency domain and a demodulation of a time domain waveform of the OTFS modulated SRS.

5. The apparatus of claim 1, wherein:

receive the OTFS modulated SRS comprises receiving the OTFS modulated SRS in a subset of symbols in which the OTFS modulated SRS is transmitted; and perform the CLI measurement comprises computing a CLI received signal strength indicator (RSSI) over the subset of symbols in which the OTFS modulated SRS is transmitted, wherein the CLI RSSI is associated with a time domain or a frequency domain and a demodulation of a time domain waveform of the OTFS modulated SRS.

6. The apparatus of claim 1, wherein the one or more processors are further configured to:

transmit, to the network entity, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

7. The apparatus of claim 1, wherein the one or more processors are further configured to:

transmit, to the network entity, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

8. The apparatus of claim 1, wherein the first UE is a victim UE and the second UE is an aggressor UE that causes inter-UE interference for the first UE.

9. An apparatus for wireless communication at a network entity, comprising:

a memory; and one or more processors, coupled to the memory, configured to:

transmit, to a first user equipment (UE), a cross-link interference (CLI) sounding reference signal (SRS) measurement resource configuration that indicates an orthogonal time frequency space (OTFS) modulated SRS associated with a second UE; and receive, from the first UE, a measurement report that indicates a CLI measurement of the OTFS modulated SRS, wherein the CLI measurement is associated with one or more symbols in which the OTFS modulated SRS is transmitted.

10. The apparatus of claim 9, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

11. The apparatus of claim 9, wherein the CLI measurement is a CLI SRS reference signal received power (RSRP) computed over a plurality of symbols in which the OTFS modulated SRS is transmitted, wherein the CLI SRS RSRP is associated with a delay-Doppler domain.

12. The apparatus of claim 9, wherein the CLI measurement is a CLI SRS reference signal received power (RSRP) computed over a subset of symbols in which the OTFS modulated SRS is transmitted, wherein the CLI SRS RSRP is associated with a frequency domain and a demodulation of a time domain waveform of the OTFS modulated SRS.

13. The apparatus of claim 9, wherein the CLI measurement is a CLI received signal strength indicator (RSSI) computed over a subset of symbols in which the OTFS modulated SRS is transmitted, wherein the CLI RSSI is associated with a time domain or a frequency domain and a demodulation of a time domain waveform of the OTFS modulated SRS.

14. The apparatus of claim 9, wherein the one or more processors are further configured to:

receive, from the first UE, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

15. The apparatus of claim 9, wherein the one or more processors are further configured to:

receive, from the first UE, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

16. A method of wireless communication performed by a first user equipment (UE), comprising:

receiving, from a network entity, a cross-link interference (CLI) sounding reference signal (SRS) measurement resource configuration that indicates an orthogonal time frequency space (OTFS) modulated SRS associated with a second UE;

receiving, from the second UE, the OTFS modulated SRS based at least in part on the CLI SRS measurement resource configuration;

performing a CLI measurement over one or more symbols in which the OTFS modulated SRS is transmitted; and transmitting, to the network entity, a measurement report that indicates the CLI measurement.

17. The method of claim 16, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

18. The method of claim 16, wherein performing the CLI measurement comprises computing a CLI SRS reference signal received power (RSRP) over a plurality of symbols in which the OTFS modulated SRS is transmitted, wherein the CLI SRS RSRP is associated with a delay-Doppler domain.

19. The method of claim 16, wherein:

receiving the OTFS modulated SRS comprises receiving the OTFS modulated SRS in a subset of symbols in which the OTFS modulated SRS is transmitted; and performing the CLI measurement comprises computing a CLI SRS reference signal received power (RSRP) over the subset of symbols in which the OTFS modulated SRS is transmitted, wherein the CLI SRS RSRP is associated with a frequency domain and a demodulation of a time domain waveform of the OTFS modulated SRS.

20. The method of claim 16, wherein:

receiving the OTFS modulated SRS comprises receiving the OTFS modulated SRS in a subset of symbols in which the OTFS modulated SRS is transmitted; and performing the CLI measurement comprises computing a CLI received signal strength indicator (RSSI) over the subset of symbols in which the OTFS modulated SRS is transmitted, wherein the CLI RSSI is associated with a time domain or a frequency domain and a demodulation of a time domain waveform of the OTFS modulated SRS.

21. The method of claim 16, further comprising:

transmitting, to the network entity, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

22. The method of claim 16, further comprising:

transmitting, to the network entity, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

23. The method of claim 16, wherein the first UE is a victim UE and the second UE is an aggressor UE that causes inter-UE interference for the first UE.

24. A method of wireless communication performed by a network entity, comprising:

transmitting, to a first user equipment (UE), a cross-link interference (CLI) sounding reference signal (SRS) measurement resource configuration that indicates an orthogonal time frequency space (OTFS) modulated SRS associated with a second UE; and receiving, from the first UE, a measurement report that indicates a CLI measurement of the OTFS modulated SRS, wherein the CLI measurement is associated with one or more symbols in which the OTFS modulated SRS is transmitted.

25. The method of claim 24, wherein the CLI SRS measurement resource configuration indicates one or more parameters associated with one or more of: an OTFS modulation applied to the OTFS modulated SRS at the second UE, a delay-Doppler domain dimension associated with the OTFS modulation, or a resource allocation pattern associated with the OTFS modulated SRS, and wherein a quantity of SRS symbols within each measurement occasion corresponds to a quantity of symbols generated by one OTFS modulation operation.

26. The method of claim 24, wherein the CLI measurement is a CLI SRS reference signal received power (RSRP) computed over a plurality of symbols in which the OTFS modulated SRS is transmitted, wherein the CLI SRS RSRP is associated with a delay-Doppler domain.

27. The method of claim 24, wherein the CLI measurement is a CLI SRS reference signal received power (RSRP) computed over a subset of symbols in which the OTFS modulated SRS is transmitted, wherein the CLI SRS RSRP is associated with a frequency domain and a demodulation of a time domain waveform of the OTFS modulated SRS.

28. The method of claim 24, wherein the CLI measurement is a CLI received signal strength indicator (RSSI) computed over a subset of symbols in which the OTFS modulated SRS is transmitted, wherein the CLI RSSI is associated with a time domain or a frequency domain and a demodulation of a time domain waveform of the OTFS modulated SRS.

29. The method of claim 24, further comprising:

receiving, from the first UE, capability signaling or UE assistance information that indicates that the first UE is capable of performing one or more of: CLI SRS reference signal received power (RSRP) measurements over a plurality of symbols in which the OTFS modulated SRS is transmitted, CLI SRS RSRP measurements over a subset of symbols in which the OTFS modulated SRS is transmitted, or CLI received signal strength indicator (RSSI) measurements over the subset of symbols in which the OTFS modulated SRS is transmitted.

30. The method of claim 24, further comprising:

receiving, from the first UE, capability signaling or UE assistance information that indicates that the first UE is capable of performing one or more of: CLI SRS reference signal received power (RSRP) measurements over a subset of symbols in which the OTFS modulated SRS is transmitted, or CLI received signal strength indicator (RSSI) measurements over the subset of symbols in which the OTFS modulated SRS is transmitted, wherein the first UE is unable to measure the OTFS modulated SRS over a plurality of symbols in which the OTFS modulated SRS is transmitted based at least in part on a collision of the OTFS modulated SRS with another signal or channel.

* * * * *